United States Patent [19]

Adelmann

[11] Patent Number: 5,269,155

[45] Date of Patent: Dec. 14, 1993

[54] PROCESS AND INSTALLATION FOR THE SEPARATION OF A MIXTURE OF TWO GASEOUS COMPONENTS

[76] Inventor: Waldemar Adelmann, Von-Bodelschwingh-Str. 67, D-8782 Karlstadt, Fed. Rep. of Germany

[21] Appl. No.: 704,136

[22] Filed: May 22, 1991

[30] Foreign Application Priority Data

May 22, 1990 [DE] Fed. Rep. of Germany ....... 4016513

[51] Int. Cl.$^5$ .......................... F25J 3/08; B01D 53/02; B29B 17/02
[52] U.S. Cl. .......................................... 62/292; 62/85; 95/41
[58] Field of Search ............... 62/292, 85, 149; 55/23, 55/24, 50

[56] References Cited

U.S. PATENT DOCUMENTS

| | | | |
|---|---|---|---|
| 1,831,644 | 11/1931 | Adair et al. | 55/23 |
| 1,974,145 | 9/1934 | Atwell | 62/85 |
| 2,202,010 | 5/1940 | Kondolf | 62/85 |
| 2,972,235 | 2/1961 | Smith | 62/85 |
| 3,286,442 | 11/1966 | Wylegala | 55/23 |
| 4,165,289 | 8/1979 | Borst | 210/669 |
| 4,878,931 | 11/1989 | Grant | 55/23 |
| 5,018,361 | 5/1991 | Kroll et al. | 62/292 X |
| 5,031,410 | 7/1991 | Plzak | 62/85 |
| 5,032,156 | 7/1991 | Luder | 55/269 |

FOREIGN PATENT DOCUMENTS 3844326 5/1989 Fed. Rep. of Germany .......... 55/23

*Primary Examiner*—Henry A. Bennet
*Assistant Examiner*—William C. Doerrler
*Attorney, Agent, or Firm*—Edwin D. Schindler

[57] ABSTRACT

In order to separate a mixture of two gaseous components with different boiling temperatures, it is proposed that the mixture be initially compressed and thereupon cooled so that its temperature lies below the boiling temperature of the gas components to be removed. The gas components to be removed undergo condensation and can be led off for reutilization without contaminating the environment. Furthermore, it is proposed to feed the gas mixture through activated carbon filters (4, 5) after the condensation process, in order to bind remaining proportions of the gas components to be removed. It is also intended to partially return the gas mixture for renewed liquefaction after it has passed through said activated carbon filters. At the same time, the invention proposes a suitable installation for the execution of this process.

14 Claims, 2 Drawing Sheets

PROCESS AND INSTALLATION FOR THE SEPARATION OF A MIXTURE OF TWO GASEOUS COMPONENTS

BACKGROUND OF THE INVENTION

1. Technical Field of the Invention

The invention concerns a process for the separation of a mixture of two gaseous components with different boiling temperatures, especially of air and chlorofluorohydrocarbons (CFCS), formed during the reutilization of PUR-foamed plastics.

2. Description of the Prior Art

Processes of this generic concept are designed to make it possible to separate a mixture of various gaseous components with different boiling points, so that the environmentally safe gas components can be discharged into the environment, whereas environmentally harmful gas components are retained in the system, collected and reutilized.

Hitherto known processes for the separation of gaseous mixtures of gas components with different boiling points use only pressure. By increasing pressure, the boiling point is raised so that the temperature of the gas mixture lies below the boiling point of the components to be eliminated, whereupon these are liquefied.

The disadvantage of processes of this kind can be seen in their comparatively low degree of effectiveness and in a high proportion of residues of gas components to be eliminated after passing through the liquefaction station.

SUMMARY OF THE INVENTION

On this basis, it is the object of the invention to provide a process and an installation for the separation of these kind of gaseous mixtures, which achieve a high degree of effectiveness in the sense that the gas components to be eliminated are only present in low quantities in the gas mixture discharged into the environment.

This object is achieved by this invention by compressing the gas mixture and cooling it to a temperature below the boiling point of the gas components to be eliminated, whereupon the liquefied gas components to be eliminated are discharged into a special tank and the remaining gas mixture, now with only a low proportion of gas components to be eliminated, expanded and exhausted via the activated carbon filters, which extract the remaining gas components to be eliminated leaving only a minimal proportion, into the environment. An additional cooling of the gas mixture can, on the one hand, reduce the pressure required to raise the boiling point and, on the other hand, increase condensation of gas components to be eliminated at a constant temperature. The process in its entirety reaches a considerably higher degree of effectiveness through the introduction of additional cooling as regards the elimination of gas components to be removed from the gas mixture. In addition, there is a considerable reduction in the loading of the activated carbon filters downstream. Furthermore, said activated carbon filters are able to almost completely absorb the now low proportion of gas components in the gas mixture, which are to be removed. Because of the low proportion of gas components to be removed following liquefaction under pressure and cooling, filter regeneration is necessary only at relatively large intervals.

Furthermore, it is proposed that after passing through the active carbon filters, the gas mixture undergo at least partially a renewed liquefaction. By means of the at least partial return of the gas mixture after passing through the activated carbon filters, the concentration of the gas components to be removed in the exhaust air is reduced once more.

In a further embodiment of the invention it is preferable to generate negative gage pressure within the activated carbon filters. This negative gage pressure ensures that even in the case of a puncturing of the filter housing, due to, for example, mechanical damaging or corrosion, none of the undesirable gas components to be removed is discharged into the environment.

Moreover, a process for the regeneration of the activated carbon filters is proposed, which is distinguished by the ventilation of the activated carbon filters in a counter-flow direction by a heated gas, preferably hot air or an inert gas, thereby releasing from the filter the proportion of the gaseous components to be removed bound by the filter, whereupon the resulting mixture of gaseous filter residues and hot gas undergoes a renewed liquefaction as described above.

The advantage involved consists therein that the regeneration of the filters allows permanent use. It is not necessary to exchange the existing activated carbon in the filters. Since regeneration is possible without any great difficulty, almost permanent operation of the installation is ensured. Regeneration can take place at night or on weekends, when the installation is not being used for separation.

In addition, an installation is proposed for the execution of the process described above, which comprises a compressor, a cooling unit, a discharge valve for the expansion of the gas mixture following the liquefaction of the components to be removed and an activated carbon filter. The advantage involved consists primarily therein that the processes according to the claimed invention can be achieved with the elements of this installation economically and without difficulty.

Moreover, in a further embodiment of the invention it is preferred to equip the installation with two parallel activated carbon filters and with a measuring and control instrument, which controls the composition of the gas mixture after its leaves the activated carbon filters and diverts the gas flow to the other respective filter if one of the gas filters is overloaded. In this way, it is reliably ensured that an undesirably high proportion of gas components to be removed is not discharged into the environment.

In the case that one of the filters is overloaded, then the gas flow is automatically diverted to the other respective filter. This rules out any environmental contamination should the saturation of a filter be overlooked. In addition, continued operation of the installation is ensured even if one the filters is being worked on.

Further details, features and advantages of the invention can be taken from the following description part in which a typical embodiment of the invention is explained in greater detail with the aid of a drawing.

BRIEF DESCRIPTION OF THE DRAWING FIGURES

FIG. 1 is a schematic side view of an installation constructed in accordance with the present invention; and, FIG. 2 is a schematic side view of the installation of FIG. 1, wherein the installation is shown as being modified for use in a regeneration process of the activated carbon filters following a prolonged period of use.

DETAILED DESCRIPTION OF THE DRAWING FIGURES

Figure 1:
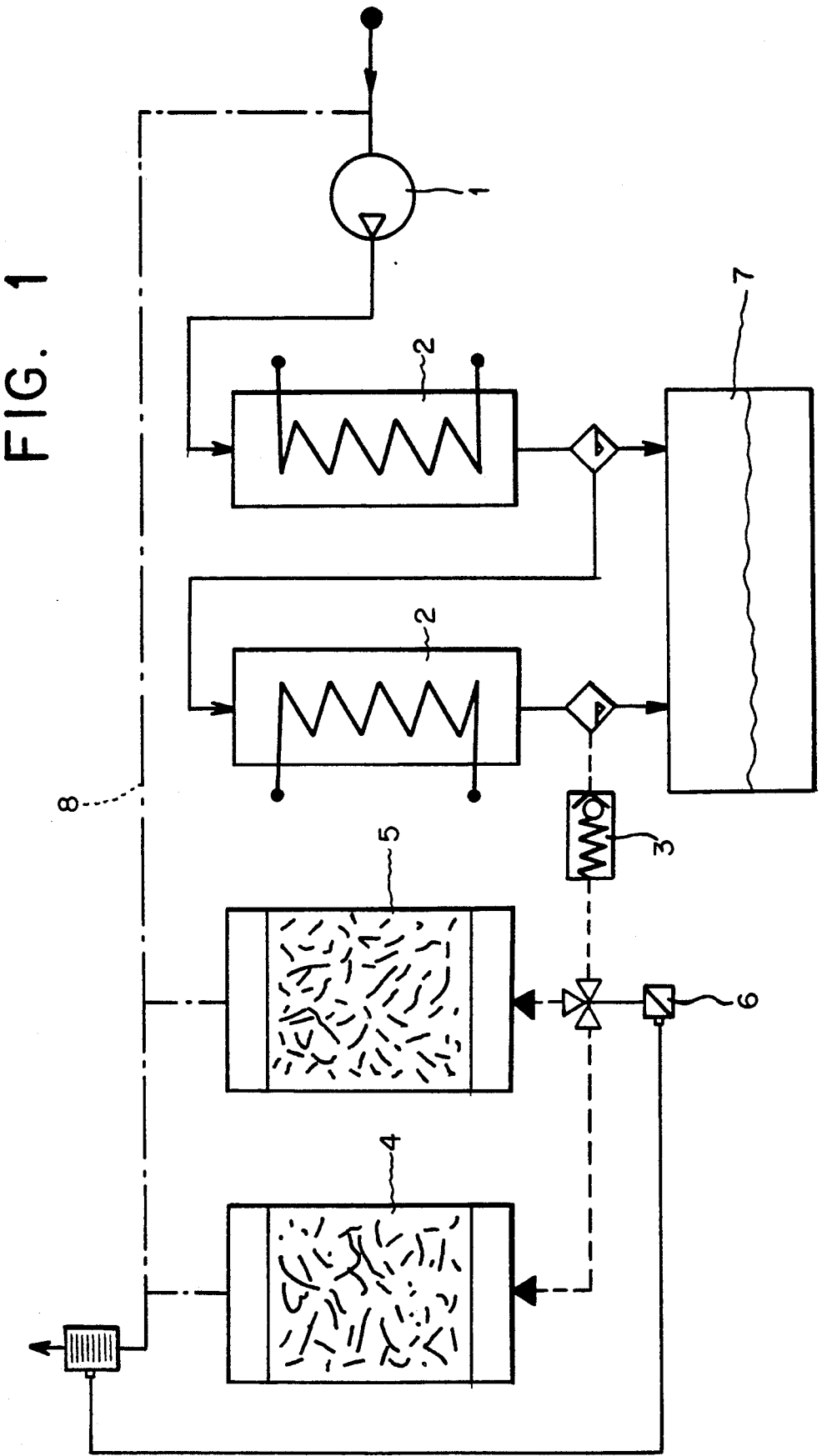

In FIG. 1, the entire installation is shown in a simplified schematic form so that functional sequences are clearly seen. The direction of flow of the gas mixture is marked by arrows.

It can be clearly recognized that the gas initially passes through the compression unit (1), in which the gas mixture is compressed to a temperature above the boiling point of the gas components to be removed. Gas components to be removed which liquefy at this stage are led off into the collection tank (7).

Afterwards, the gas mixture passes through the cooling unit (2), where the largest proportion of gas components to be removed is liquefied through condensation. Here too, the condensate gas components to be removed are led off into said collection tank (7). Thereupon, the gas mixture passes through the activated carbon filters (4) and (5), via a discharge valve (3), where it is expanded. By means of a measuring and control instrument (6), the proportion of gas components to be removed after passing through said activated carbon filters (4, 5) is determined. The control instrument (6) regulates the distribution of the gas mixture to said activated carbon filters (4, 5), so that if one of said filters (4, 5) becomes overloaded, distribution is immediately and automatically changed over to the other respective filter. A line is also recognizable (8), which serves the partial return of the gas mixture for liquefaction after it has passed through the activated carbon filters.

Figure 2:
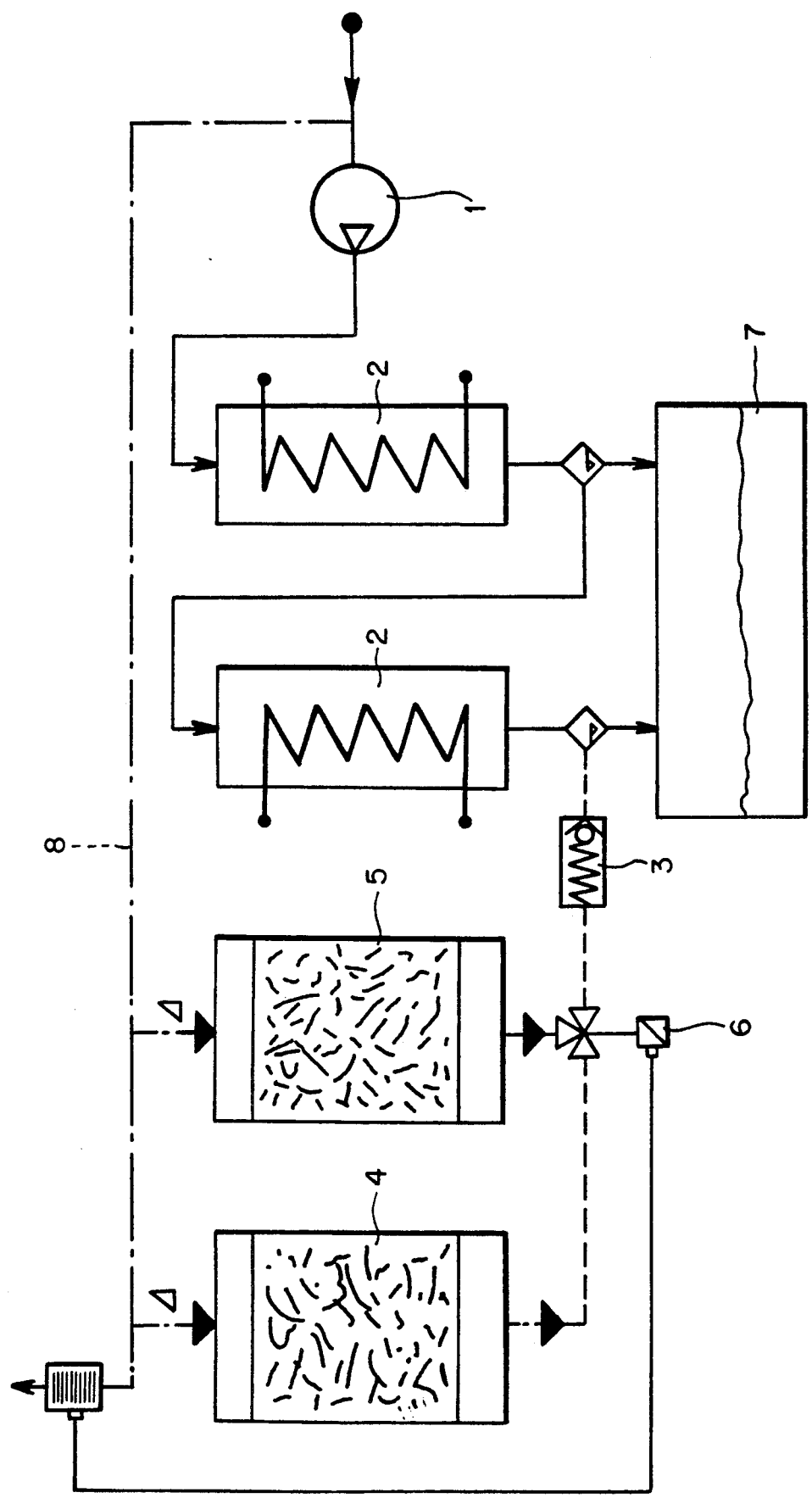

FIG. 2 is a schematic side view of the installation of FIG. 1, outlining a process for the regeneration of the activated carbon filters (4, 5) following a prolonged period of use. The regeneration process takes place by ventilating the activated carbon filters (4, 5), in a counterflow direction (shown with by an arrow), with a heated gas, preferably hot air or an inert gas. This counterflow ventilation results in the extraction of bound particles from the activated carbon filters (4, 5) of the gas components to be eliminated from the filter. The resulting mixture of gaseous filter residues and hot gas undergoes renewed particle liquefaction, as described above.

I claim:

1. A process for separating a mixture of two gaseous components having different boiling point temperatures formed during a re-utilization of PUR-foamed plastics, comprising the steps of:
   compressing said mixture for raising the temperature of said mixture above the boiling point temperature of the gaseous component to be eliminated;
   cooling said mixture of two gaseous components below the boiling point temperature of the gaseous component to be eliminated from said mixture, said gaseous component to be eliminated thereby being liquefied by condensation;
   discharging the liquefied gas component of said cooling step into said tank thereby eliminating from said mixture the gaseous component to be eliminated and leaving a resulting gaseous mixture;
   expanding the resulting gaseous mixture; and,
   exhausting the resulting gaseous mixture through at least one activated carbon filter for removing any remaining gaseous component to be eliminated.

2. The process for separating a mixture of two gaseous components according to claim 1, further comprising the step of:
   regenerating said activated carbon filter by ventilating said activated carbon filter with a hot gas in a counterflow direction for extracting bound particles of said gas component to be eliminated, thereby providing a resulting mixture of gaseous filter residues and hot gas.

3. The process for separating a mixture of two gaseous components according to claim 2, further comprising the step of:
   subjecting said resulting mixture of gaseous filter residues and hot gas to said compressing step, said cooling step and said discharging step.

4. The process for separating a mixture of two gaseous components according to claim 2, wherein said hot gas is a member selected from the group consisting of hot air and an inert gas.

5. The process for separating a mixture of two gaseous components according to claim 1, wherein said exhausting step is carried out with two activated carbon filters.

6. A process for separating a mixture of two gaseous components having different boiling point temperatures formed during a re-utilization of PUR-foamed plastics, comprising the steps of:
   compressing said mixture for raising the temperature of said mixture above the boiling point temperature of the gaseous component to be eliminated;
   cooling said mixture of two gaseous components below the boiling point temperature of the gaseous component to be eliminated from said mixture, said gaseous component to be eliminated thereby being liquefied by condensation;
   discharging the liquefied gas component of said cooling step into a tank thereby eliminating from said mixture said gaseous component to be eliminated and leaving a resulting gaseous mixture; and,
   passing said resulting gaseous mixture through at least one activated carbon filter for removing any remaining gaseous component to be eliminated;
   repeating, at least one time, said compressing step, said cooling step and said discharging step;
   expanding the resulting gaseous mixture; and,
   exhausting the resulting gaseous mixture through at least one activated carbon filter for removing any remaining gaseous component to be eliminated.

7. The process for separating a mixture of two gaseous components according to claim 6, further comprising the step of:
   regenerating said activated carbon filter by ventilating said activated carbon filter with a hot gas in a counterflow direction for extracting bound particles of said gas component to be eliminated, thereby providing a resulting mixture of gaseous filter residues and hot gas.

8. The process for separating a mixture of two gaseous components according to claim 7, further comprising the step of:
   subjecting said resulting mixture of gaseous filter residues and hot gas to said compressing and cooling step and said discharging step.

9. The process for separating a mixture of two gaseous components according to claim 7, wherein said hot gas is a member selected from the group consisting of hot air and an inert gas.

10. The process for separating a mixture of two gaseous components according to claim 6, wherein said passing step and and exhausting step are carried out with two activated carbon filters.

11. Apparatus for separating a mixture of two gaseous components having different boiling point temperatures formed during a re-utilization of PUR-foamed plastics, comprising:

- a compressor for compressing a mixture of gases to a temperature above the boiling point temperature of a component of said mixture to be removed;
- a cooling unit for cooling said mixture and liquifying the component of said mixture to be removed via condensation;
- means for transferring said mixture from said compressor to said cooling unit;
- a collection tank for collecting the component of said mixture to be removed in a liquified phase from said compressor and said cooling unit with a resultant gas mixture remaining after removal of the liquified phase;
- a discharge valve for expanding the resultant gas mixture;
- means for transferring the resultant gas mixture from said cooler through said discharge valve; and,
- activated carbon filter means for filtering the resultant gas mixture, received from said discharge valve, for removal of the component of said mixture to be removed.

12. The apparatus for separating a mixture of two gaseous components according to claim 11, further comprising a control instrument for regulating flow of the resultant gas mixture to said activated carbon filter means, said activated carbon filter means comprising two activated carbon filters with said control instrument regulating the flow of the resultant gas mixture so that if one of said activated carbon filters becomes overloaded, flow is changed over to the second of said activated carbon filters by said control instrument.

13. The apparatus for separating a mixture of two gaseous components according to claim 12, wherein said two activated carbon filters are arranged in parallel.

14. The apparatus for separating a mixture of two gaseous components according to claim 11, further comprising means for returning at least a portion of the resultant gas mixture to said compressor after passage through said activated carbon filter means.

* * * * *